(12) United States Patent
Starck et al.

(10) Patent No.: US 7,172,133 B2
(45) Date of Patent: Feb. 6, 2007

(54) HEATABLE DILATION ELEMENT

(75) Inventors: Roland Starck, Bellheim (DE); Barbu Scarlat Frunzetti, Kornwestheim (DE); Wolfgang Richter, Kornwestheim (DE)

(73) Assignees: Eichenauer Heizelemente GmbH & Co. KG, Kandel (DE); Behr Thermot-Tronik GmbH, Kornwestheim (DE)

( * ) Notice: Subject to any disclaimer, the term of this patent is extended or adjusted under 35 U.S.C. 154(b) by 313 days.

(21) Appl. No.: 10/469,170

(22) PCT Filed: Mar. 4, 2002

(86) PCT No.: PCT/EP02/02322

§ 371 (c)(1),
(2), (4) Date: Nov. 26, 2003

(87) PCT Pub. No.: WO02/086646

PCT Pub. Date: Oct. 31, 2002

(65) Prior Publication Data

US 2004/0094633 A1 May 20, 2004

(30) Foreign Application Priority Data

Mar. 2, 2001 (DE) ................................ 101 10 185

(51) Int. Cl.
*F01P 7/02* (2006.01)
(52) U.S. Cl. .................................. 236/34.5; 236/101 C
(58) Field of Classification Search .............. 236/93 A, 236/95, 99 K, 100, 99 B, 34, 34.5, 68 R, 236/68 B, 68 C
See application file for complete search history.

(56) References Cited

U.S. PATENT DOCUMENTS

| 3,404,530 | A |   | 10/1968 | Churchill et al. |
| 4,685,651 | A | * | 8/1987 | Nouvelle et al. ......... 236/68 R |
| 4,961,530 | A | * | 10/1990 | Wagner .................... 236/34.5 |
| 5,033,865 | A | * | 7/1991 | Kuze ........................ 236/34.5 |
| 5,385,296 | A | * | 1/1995 | Kurz et al. ................ 236/34.5 |
| 5,396,770 | A |   | 3/1995 | Petot et al. |
| 6,439,467 | B2 | * | 8/2002 | Mabboux et al. ......... 236/34.5 |

FOREIGN PATENT DOCUMENTS

| DE | 34 86 345 T2 | 7/1988 |
| DE | 4233 913 A 1 | 4/1994 |
| DE | 44 09 547 C 2 | 1/1995 |
| DE | 197 05 721 A1 | 8/1998 |
| EP | 0 718 738 A2 | 6/1996 |

OTHER PUBLICATIONS

German Search Report.

* cited by examiner

*Primary Examiner*—Chen-Wen Jiang
(74) *Attorney, Agent, or Firm*—Antonelli, Terry, Stout and Kraus, LLP.

(57) ABSTRACT

Expansion or elastic material working element, particularly for operating a thermostatic valve, having a housing and a movable working pin led out of the housing, the housing containing expansion material and a heating device with an electrical resistance element applied to a support. More particularly for increasing the response speed of such a device, according to the invention the support has a cavity and the resistance heating element is a heating conductor wound around the support.

30 Claims, 9 Drawing Sheets

Fig_1

HEATABLE DILATION ELEMENT

The invention relates to an expansion or elastic material working element, particularly for operating a thermostatic valve, having a housing and a movable working pin moved out of the housing, in which in said housing are located expansion material and a heating device with an electrical resistance element applied to a support.

Particularly in the cold running phase, engines have increased consumption and emission values, so that said phase must be shortened. This is brought about by reducing the circulated coolant quantity during the cold running and warm-up phase. For this purpose the coolant circuit of an internal combustion engine has a main valve blocking the through-flow in the case of cold coolant and a bypass valve which then opens. The regulation of such a valve on the basis of engine and operating data such as exhaust temperature, speed, torque and oil temperature takes place by means of a preamble-basing device for controlling such a thermostatic valve by the supply of electric power to the heating device.

EP 718 738 A2 discloses a heating device with a planar support, to which is applied a thick-film resistor. It is disadvantageous that the thick-film resistor is only in contact on its side remote from the support with the expansion material, such as expansion material wax and through the construction of the support the heating surface is small. As a result of the central, diagonal arrangement of the support the travel or stroke of the operating pin is limited.

DE 197 05 721 A1 discloses a preamble-basing device, in which the PTC element is located on the outside of the housing. The heat transfer to the expansion material in the housing is poor. This fundamentally also applies in the case of DE 42 33 913 A1 and DE 44 09 547 C2, where a PTC element is frontally located in the interior of the housing and only has a small contact surface with the expansion material.

The object of the invention is to further develop a device according to the preamble in such a way that with an inexpensive and reliable manufacture, there is a short response speed (transient response) and intrinsic operating reliability.

In the case of a preamble-basing device, the invention solves this problem in that the support has a cavity and the resistance heating element is a heating conductor wound around the support.

As a result of the construction according to the invention the resistance heating element in the form of a heating conductor has a limited weight and can therefore be very rapidly heated, the construction as a heating conductor permitting a large heat transfer surface to the expansion material, which is assisted by the construction of a cavity in the heater circuit. In addition, said cavity allows a long travel of the operating pin.

Particularly compared with the known thick-film element and for the same dimensions, more particularly the same external dimensions of the housing, the invention gives a six times larger heat emission surface, so that the specific heat output is correspondingly reduced for the same power supply, which significantly decreases the risk of local overheating. As a result of the cavity and for the same casing dimensions, the heating device can have a greater axial length without reducing the travel of the operating pin. This allows a uniform heating of the expansion material due to its poor thermal conductance over a large part of the housing height. The reaction times of the device according to the invention are significantly reduced.

According to a preferred development of the invention the heating conductor has a positive coefficient of the electrical resistance, i.e. the resistance-temperature characteristic increases in monotonic manner in the working range.

This eliminates the risk of an overheating of the expansion material and a destruction of the inventive device through the self-regulating characteristics of the heating element.

According to a preferred development, the heating conductor has a positive temperature coefficient of the electrical resistance of $>2\times10^{-3}$/K. Thus, in the standard temperature range of the coolant of an internal combustion engine, the heat output of the resistance heating element is reduced by roughly a third, so that the heat supply through the heating element is lower at high temperatures than the heat dissipation through the coolant flowing round the expansion material, so that overheating is prevented.

According to a preferred development of the inventive device, the support has a substantially cylindrical outer contour and the support body a many-sided outer contour and in particular the support has a cage-like structure. A cage-like structure can be formed in that the support has longitudinal and transverse ribs. The heating conductor is preferably wound around the longitudinal ribs of the support. This ensures an all-round contact between the heating conductor and expansion material, so that the response speed is increased.

For the all-round insulation of the individual heating conductor turns, said heating conductor is enveloped by a high temperature-resistant insulating layer. The insulating layer or coating can be of polyimide lacquer, ceramic or glass.

According to a preferred development, the support body is made from high temperature-resistant material. The support can in particular be made from heat-resistant plastic, such as polyphenylene sulphide (PPS) or liquid crystal polymer (LCP), a polymer reinforced by fibre formation, but also epoxy resin, such as Araldite(c), and finally also ceramic, particularly injection mouldable polymer ceramic, i.e. polymer-bound ceramic in the starting state.

A heating conductor with a positive temperature coefficient preferably comprises an alloy based on an iron-nickel alloy, which can also contain further elements such as chromium. The nickel proportion is in particular between 65 and 75%, being preferably approximately 70%, the iron proportion is 25 to 35%, preferably being approximately 30% and the chromium proportion is optionally in the range 0.5 to 2%, preferably approximately 1%.

The specific electrical resistance of such a PTC wire rises from approximately 0.3 $\Omega mm^2 m^{-1}$ at room temperature of 200 in substantially linear manner with the factor $C_8=1+\alpha\Delta T$ for determining the resistance at different temperatures, the temperature coefficient $\alpha$ in the largely linear application range being approximately $\alpha=3000\times10^{-6}/C°$.

According to a preferred development of the invention, the support is sealed by an O-ring in the housing of its contact part-carrying ends, because in particular the O-ring is positioned between the housing and support in a ring step of the support body or the O-ring is located in a circumferential annular groove positioned laterally on a base of the support. Thus, the support can be sealingly connected to the housing. This construction is particularly advantageous if, as in accordance with a further development, contact parts are moulded into a base of the support. A rational manufacture of the support body with contact parts therein and therefore the inventive device is achieved with a method for the manufacture of a support for such a device, in which contact parts are supplied to the injection mould for a support for a heating conductor in the form of a blanking skeleton.

Further features and advantages of the invention can be gathered from the claims and the following description of embodiments of the invention with reference to the attached drawings, wherein show:

Figure 1:
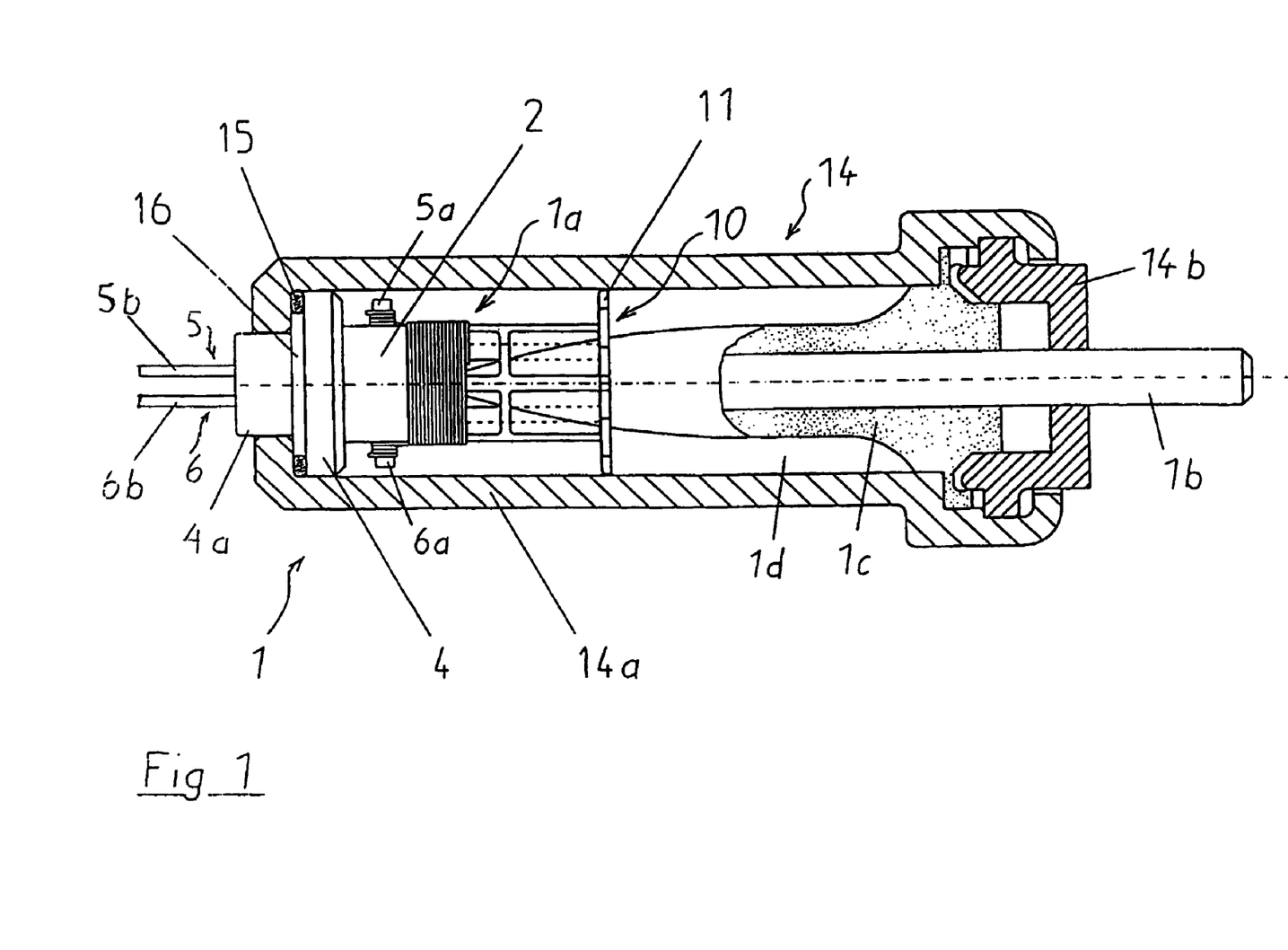
FIG. 1 A longitudinal section through an inventive device for controlling a thermostatic valve.

A device 1 according to the invention has a substantially cylindrical housing 14 with a cup-shaped lower part 14*a* and an upper part 14*b*, which by beading the free front side of the housing lower part 14*a* is firmly connected therewith to the housing 14.

In the area of the housing lower part 14*a* remote from the housing upper part 14*b* is provided a heating device 1*a*. An operating pin 1*b* surrounded by a membrane 1*c* within the housing is passed out of the housing upper part 14*b*. The further inner space of the housing 14 is filled by an expansion or elastic material element 1*d*, such as an expansion material wax.

Figure 2:
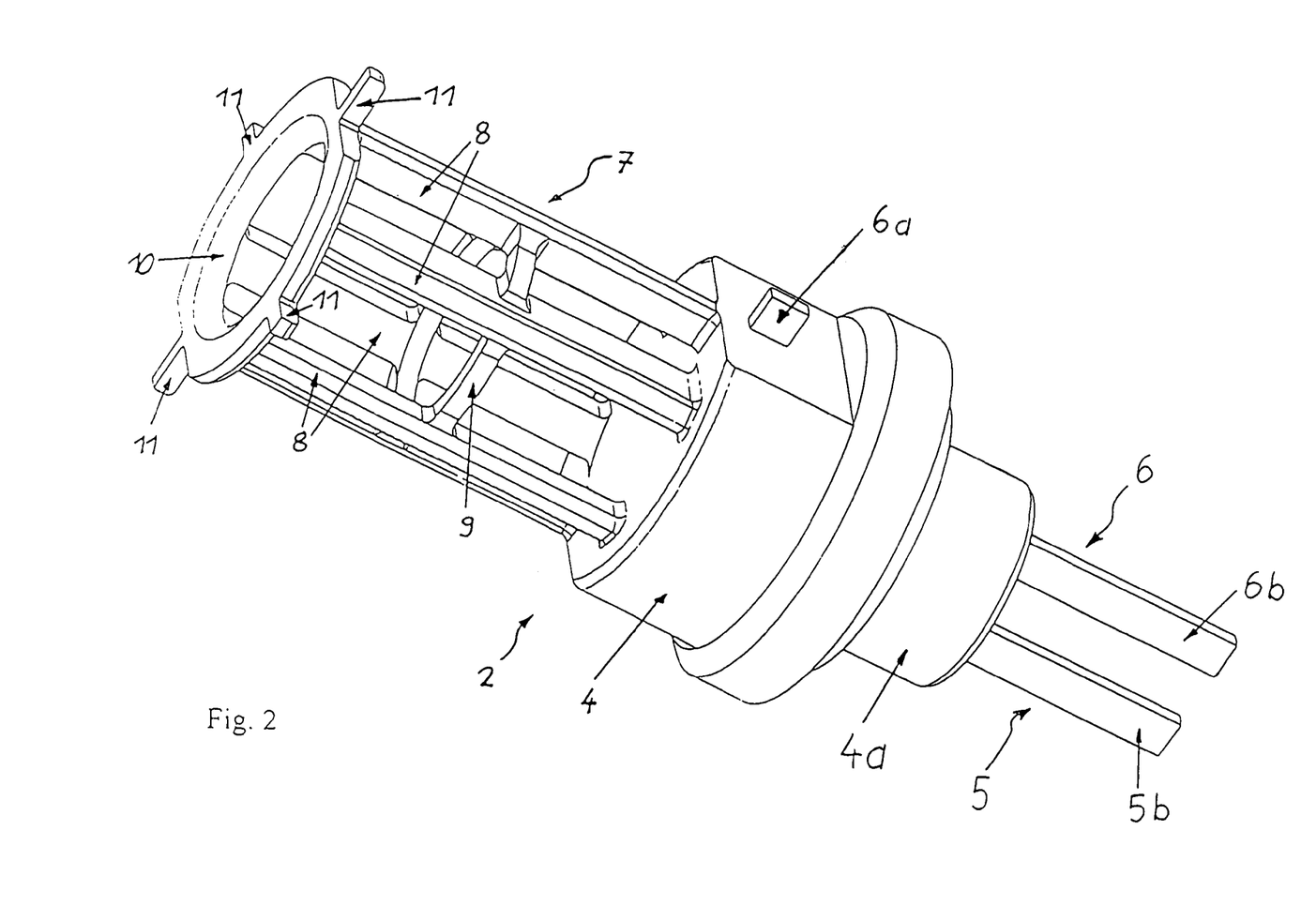
FIG. 2 A perspective view of a support for the heating conductor with moulded in contact parts.
Figure 3:
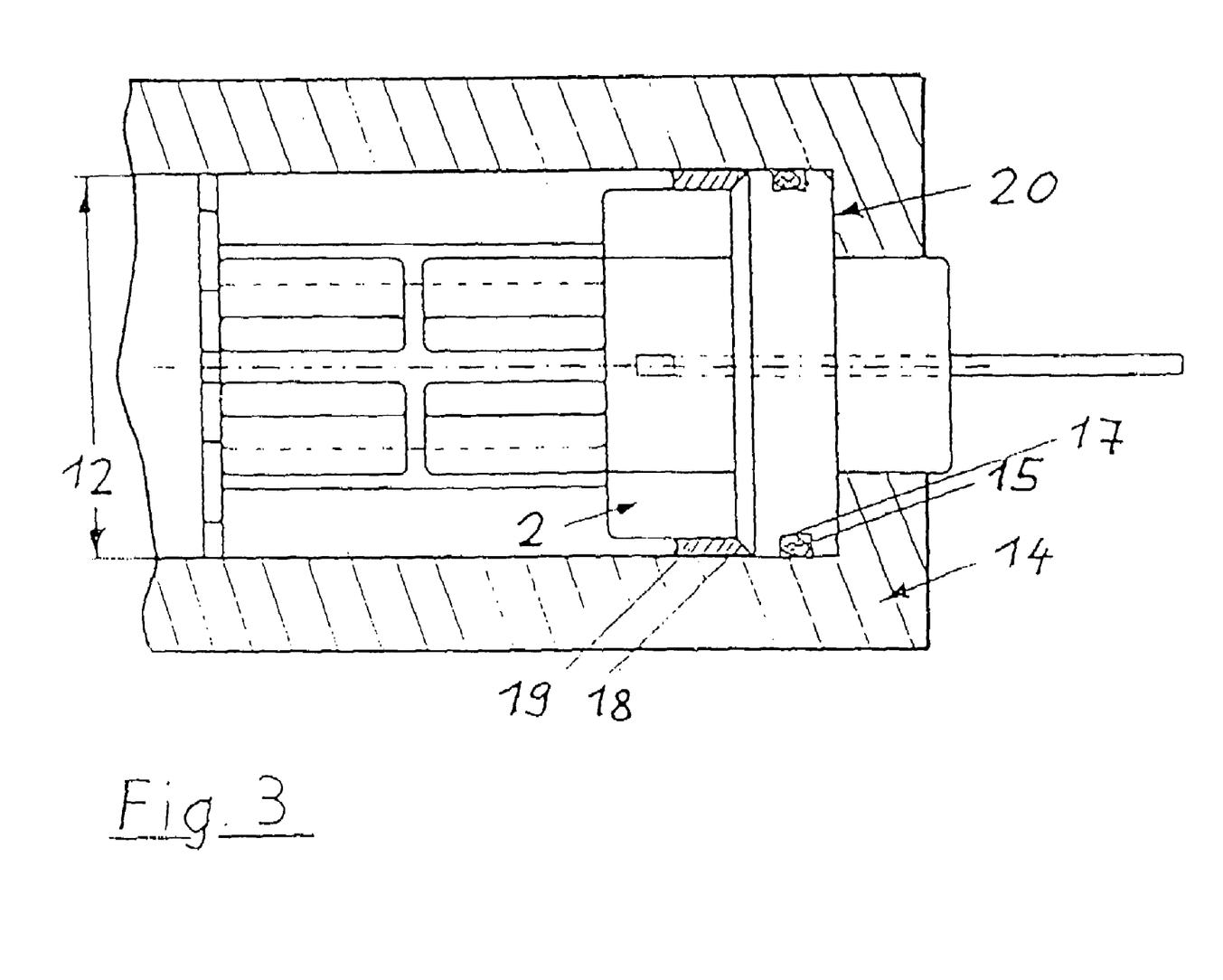
FIG. 3 A part sectional representation of the inventive device with a different type of seal in the bottom area compared with FIG. 1.
Figure 4:
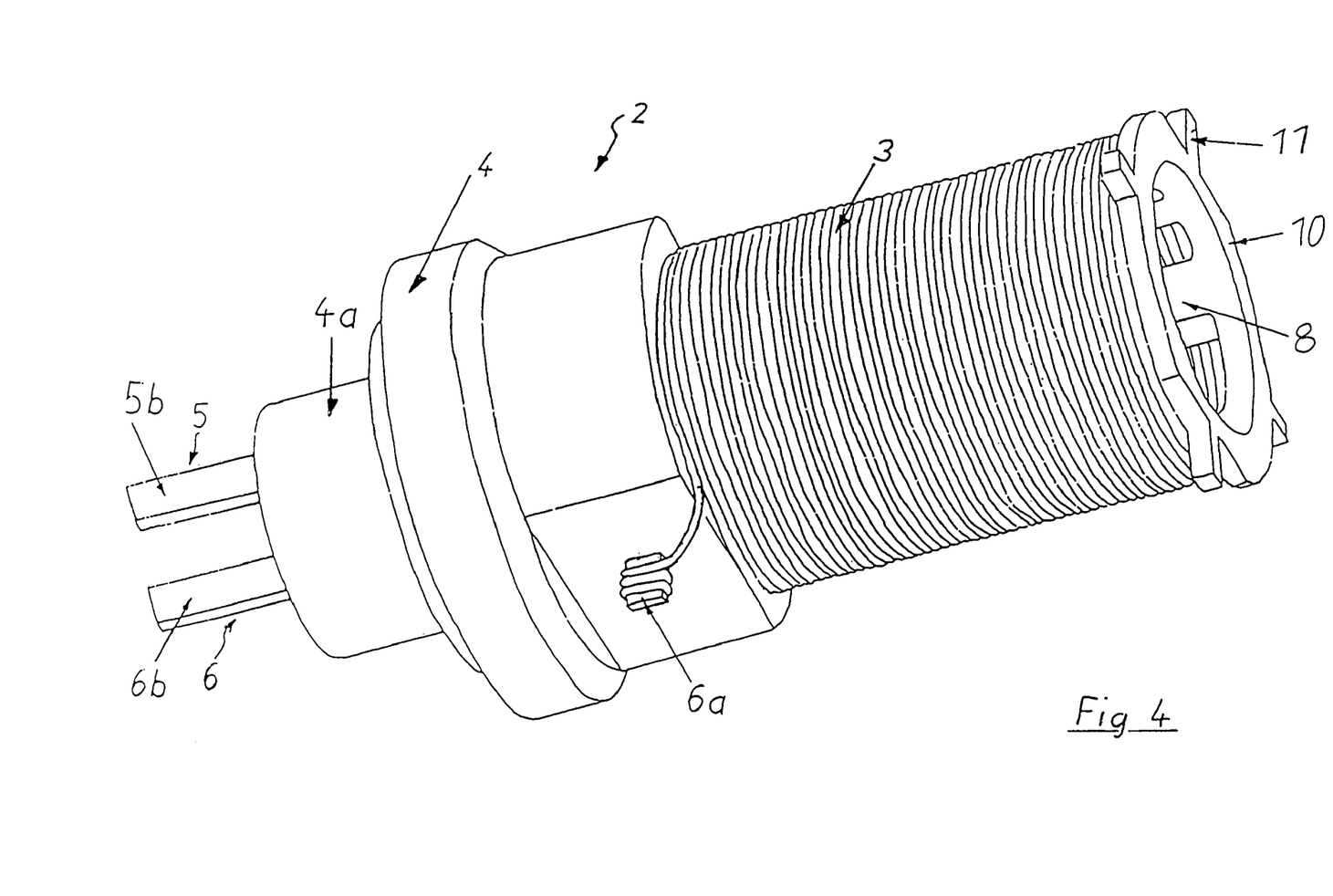
FIG. 4 A perspective view of an inventive heating device.

The heating device 1*a* has a support 2, which has a bobbin 7 formed in cage-like manner from longitudinal and transverse ribs 8, 9. The transverse ribs 9, only one being shown in the embodiment, stabilize the bobbin 7 and prevent a constriction of the longitudinal ribs 8 during the winding of the heating wire. A solid ring 10 is formed on the upper end of the support body. The ring 10 has lugs 11, whose external dimensions correspond to the internal diameter of the cylindrical housing lower part 14*a*. On the side of the support 2 remote from the ring 10 is formed a base 4, whose diameter corresponds to the internal diameter of the housing lower part 14*b*. The base 4 and ring 10 with lugs 11 in this way centre the support 2 in housing 14. Within the base 4 is formed a ring step 16 which, for sealing purposes, receives an O-ring 15. An alternative sealing of the support 2 is shown in FIG. 3. In the latter case laterally on the base 4 of support 2 is formed a radially circumferential annular groove 17, which also receives an O-ring for sealing purposes. This leads to a large bearing surface 20 between support 2 and housing 14 and consequently high security is provided also with respect to the high internal pressure prevailing in the housing 14. In addition, in the case of the construction according to FIG. 3, in the area of a keyway 18 between base 4 and inner wall of housing 14 is introduced a sealing compound 19, which also has a sealing action through the high internal pressure. This sealing compound 19 can also be provided in the construction according to FIG. 1.

Into the base 4 of support 2 are moulded contact parts 5, 6 with inner connection ends 5*a*, 6*a* and outer connection ends 5*b*, 6*b*, which in each case project out of the support 2. A heating wire 3 is wound in single layer form around the bobbin 7 and to its two ends are connected in each case with inner connection ends 5*a*, 6*a* contact parts 5, 6.

Figure 5:
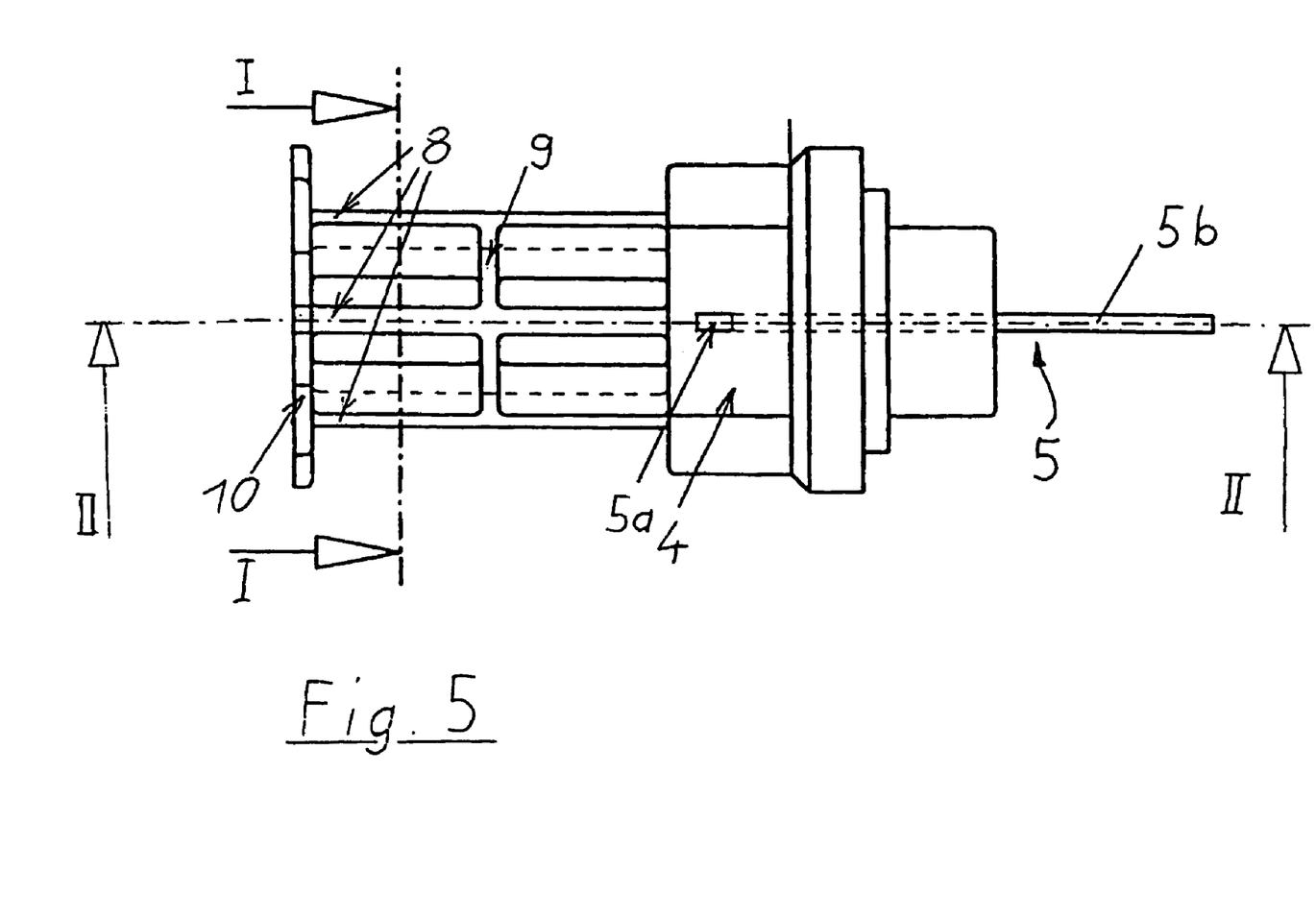
FIG. 5 A side view of a support according to FIG. 2.
Figure 6:
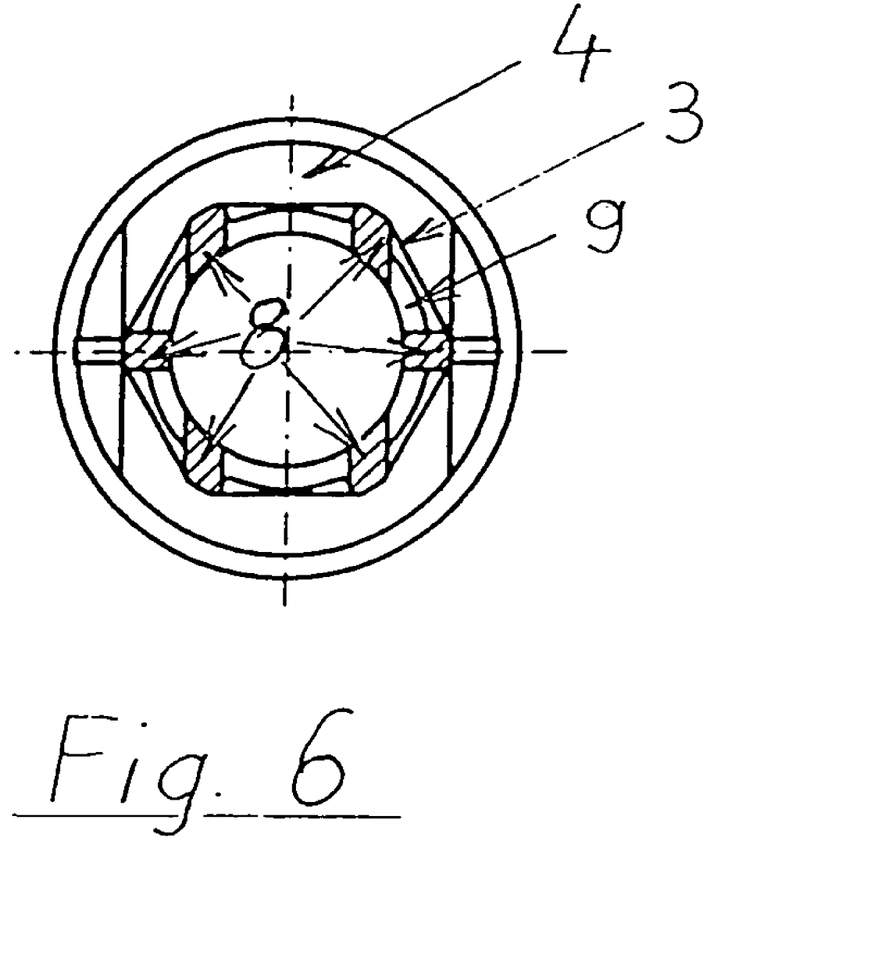
FIG. 6 A section through the object of FIG. 5 along line I—I.

In FIG. 6, which shows section I—I of FIG. 5 through support 2, it can be gathered that an inner boundary line of longitudinal and transverse ribs 8, 9 of this exemplified embodiment form a circle, so that the interior of the support body 2 is cylindrical. The outsides or outer edges of the in this embodiment longitudinal ribs 8 project over the external dimensions of the in this case transverse rib 9 in such a way that the outer connecting line of two adjacent longitudinal ribs 8 is located outside the external dimensions of the transverse rib 9. Thus, a heating wire 3 wound around the outsides of the longitudinal ribs 8 does not touch the transverse ribs 9 and therefore, as in the area of the openings between longitudinal and transverse ribs 8, 9, can be flowed around by the expansion material wax in all-round manner also in the vicinity of the transverse ribs 9. As a result of the provision of the longitudinal ribs 8, in the exemplified embodiment shown the heating wire is in the form of a regular hexagon. A different number of longitudinal ribs 8, e.g. between 3 and 10, preferably between 4 and 8, is also possible.

Figure 7:
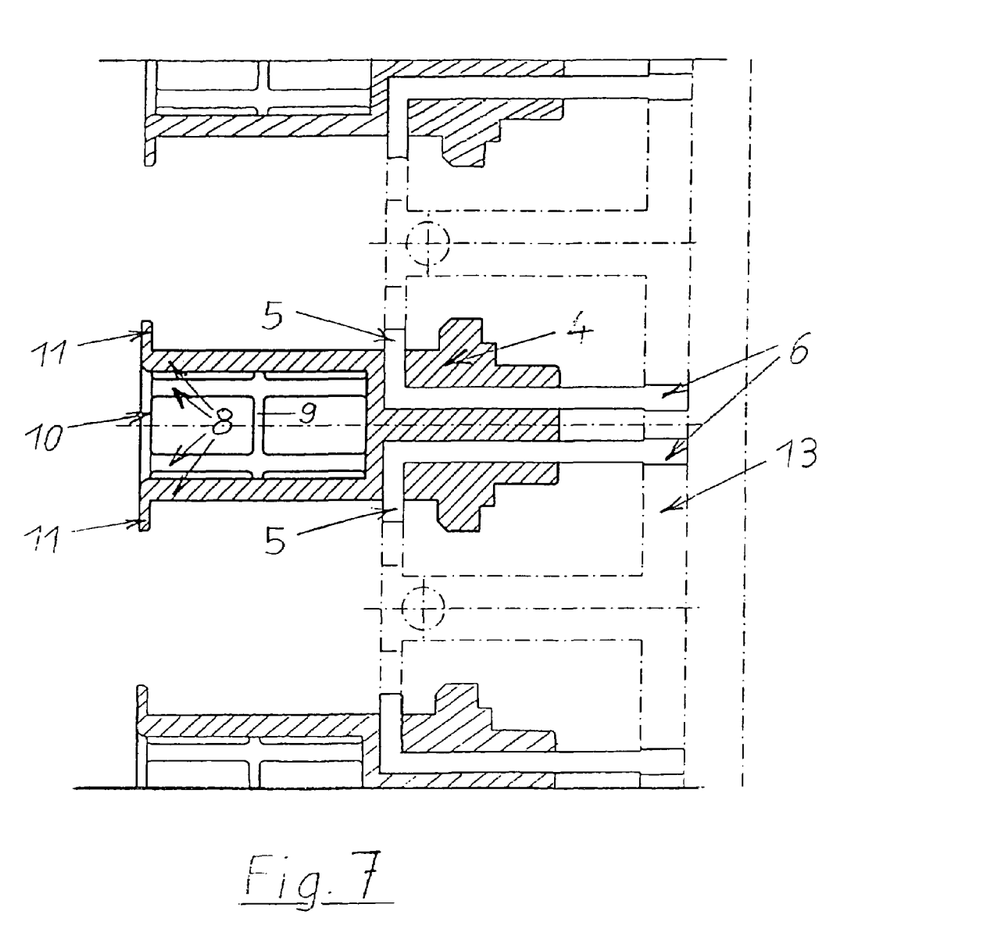
FIG. 7 A view of a heating conductor support during manufacture with a section corresponding to II—II in FIG. 4.

The moulding of the contact parts 5, 6 in support 2 is indicated in FIG. 7. FIG. 7 makes it clear that the contact parts 5, 6 are in the form of a blanking skeleton and during the injection moulding process the parts shown in dot-dash line form in FIG. 7 of said skeleton are still present. As is clear from FIG. 7, simultaneously several supports 2 are moulded in the mould. After the removal of support 2 and the blanking skeleton from the injection mould the dot-dash line-shown parts are removed, so that all that remains connected to the individual supports 2 are the contact parts 5, 6 shown in continuous line form. This ensures a rational and good sealing connection of the contact parts 5, 6 to the outside.

Figure 8A:
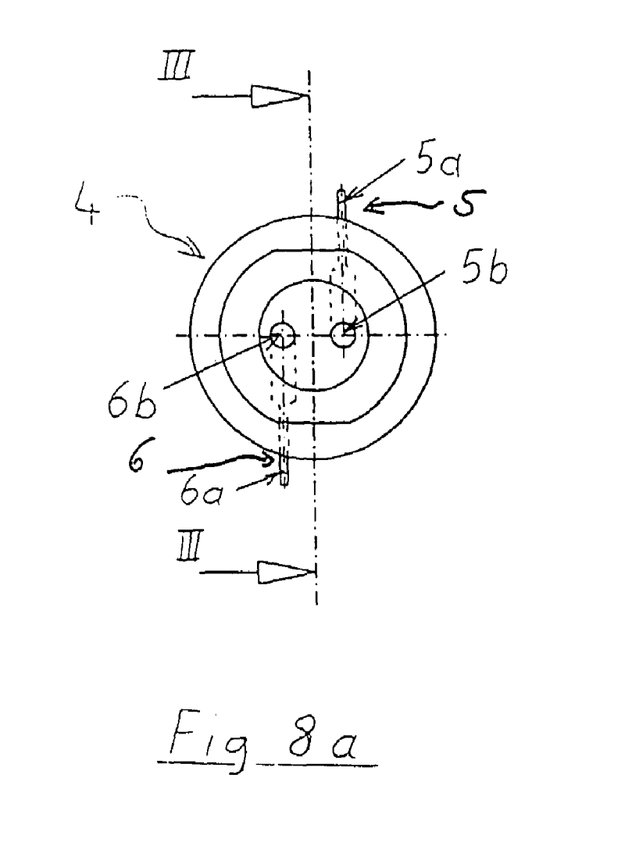
FIGS. 8*a* & *b* Alternative constructions of the contact parts with support, here a plan view of the underside of the support and a section along line III—III.
Figure 8B:
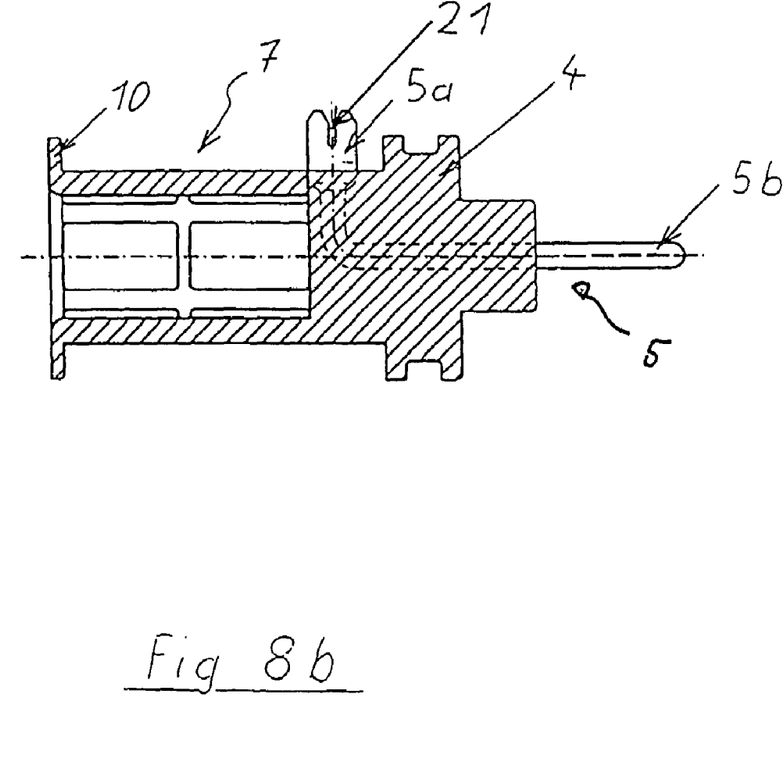

In an alternative construction of the contact parts 5, 6 they are given a round construction, instead of being made from flat material. The inner ends 5*a* and 6*a* are pressed flat and shaped as forks 21. The heating wire is fixed thereto in such a way that it is firstly wound behind the fork and the end is then passed through the gap in said fork 21. By compressing the fork tips, the end is reliably fixed by melting the insulating material layer during soldering at this point. The electrical connection is made (cf. FIG. 8).

Figure 9:
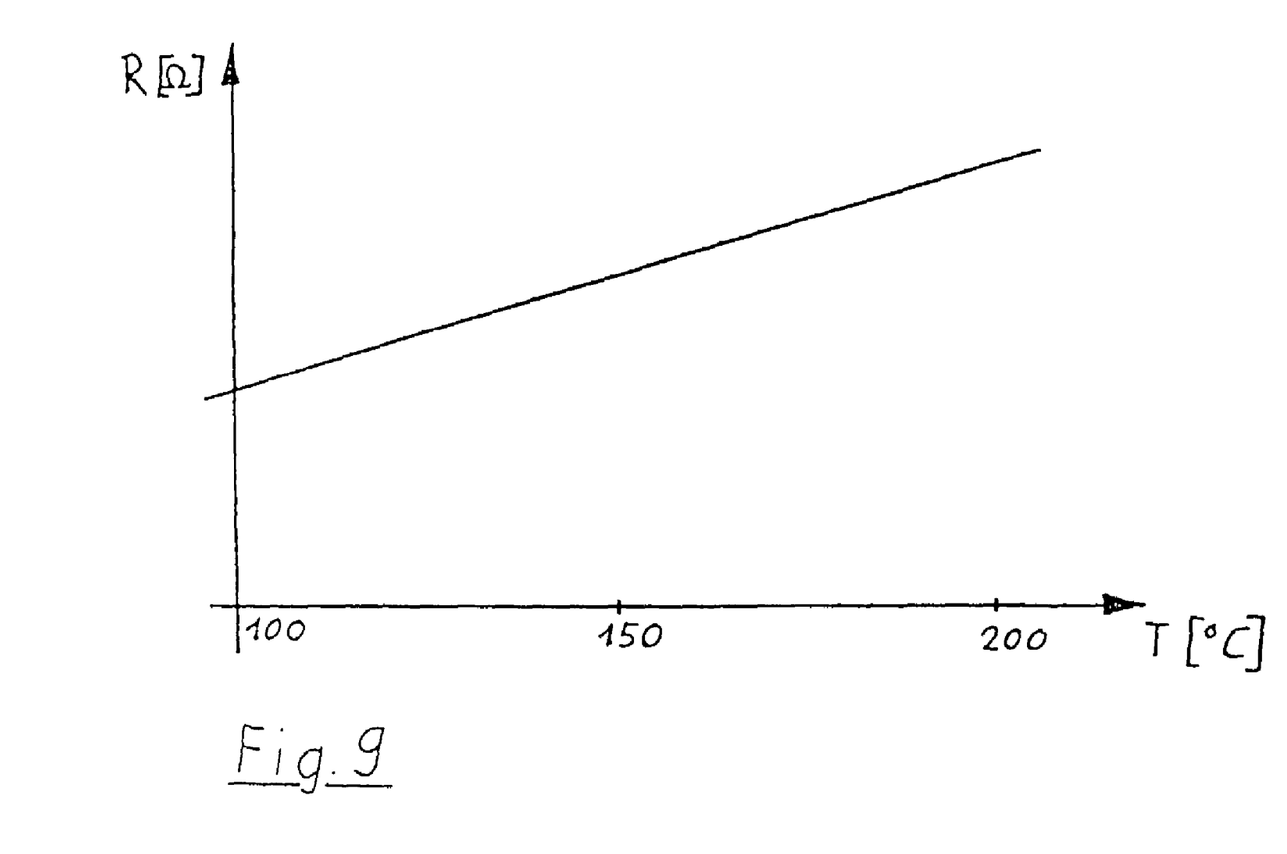
FIG. 9 Resistance-temperature characteristics of a heating conductor material used in preferred manner.

FIG. 9 shows the monotonic increasing resistance-temperature characteristic of the heating conductor.

The invention claimed is:

1. An expansion material working element comprising a housing and a movable working pin led out of the housing, wherein in the housing are provided expansion material and a heating device with an electric resistance element applied to a support, wherein the support has a cage-like structure and a cavity, and that wherein the resistance heating element is a heating conductor wound around the support.

2. Working element according to claim 1, wherein the heating conductor has a positive temperature coefficient of the electrical resistance.

3. Working element according to claim 2, wherein the heating conductor has a positive temperature coefficient of the electrical resistance of $>2\times10^{-3}$/K.

4. Working element according to claim 1, wherein the support has a substantially cylindrical inner contour.

5. Working element according to claim 1, wherein the support has a many-sided outer contour.

6. Working element according to claim 1, wherein the support has longitudinal and transverse ribs.

7. Working element according to claim 1, wherein the heating conductor is wound around the outer edges of the longitudinal ribs.

8. Working element according to claim 7, wherein the heating conductor is wound in single layer form onto the support.

9. Working element according to claim 8, wherein the material of the heating conductor is a nickel-iron alloy.

10. Working element according to claim 9, wherein the heating conductor is coated with a high temperature-resistant insulating layer.

11. Working element according to claim 10, wherein the heating conductor is coated with a polyimide lacquer insulating layer.

12. Working element according to claim 10, wherein the heating conductor is coated with a ceramic insulating layer.

13. Working element according to claim 10, wherein the heating conductor is coated with a glass insulating layer.

14. Working element according to claim 13, wherein the support is made from a high temperature-resistant material.

15. Working element according to claim 14, wherein the support is made from thermoplastic material.

16. Working element according to claim 15, wherein the support body is made from polyphenylene sulphite or liquid crystal polymer.

17. Working element according to claim 14, wherein the support is made from thermosetting plastic.

18. Working element according to claim 17, wherein the support body is made from epoxy resin.

19. Working element according to claim 14, wherein the support is made from injection mouldable polymer ceramic.

20. Working element according to claim 19, wherein the contact parts are moulded into a base of the support.

21. Working element according to claim 20, wherein the support in casing has its contact parts carrying ends sealed by an O-ring.

22. Working element according to claim 21, wherein the O-ring is located between housing and support in a ring step of the support.

23. Working element according to claim 21, wherein the O-ring is located in an annular, circumferential groove (17) positioned laterally on a base of support.

24. Working element according to claim 23, wherein a base of the support has on its side facing the heating conductor a keyway in which sealing compound is located.

25. Working element according to claim 24, wherein the contact parts are made from flat material.

26. Working element according to claim 24, wherein the contact parts are made from round material.

27. Working element according to claim 26, wherein the inner end parts of the contact parts are pressed flat and constructed in fork manner.

28. Working element according to claim 27, wherein the heating wire, below the fork, is wound onto the end of the contact part, passed through the fork and the tip thereof is compressed for fixing the heating wire edge.

29. Thermostatic valve for the coolant circuit of an internal combustion engine, comprising an expansion material working element, the working element comprising a housing and a movable working pin led out of the housing, wherein in the housing are provided expansion material and a heating device with an electric resistance element applied to a support, wherein the support has a cage-like structure and a cavity, and wherein the resistance heating element is a heating conductor wound around the support.

30. Thermostatic valve, comprising an expansion material working element, the working element comprising a housing and a movable working pin led out of the housing, wherein in the housing are provided expansion material and a heating device with an electric resistance element applied to a support, wherein the support has a cage-like structure and a cavity, and wherein the resistance heating element is a heating conductor wound around the support.

* * * * *